US010814446B2

(12) United States Patent
Nakazawa

(10) Patent No.: US 10,814,446 B2
(45) Date of Patent: Oct. 27, 2020

(54) MOTOR WITH SHAFT MOVABLE IN LIMITED MANNER, AND MACHINE TOOL

(71) Applicant: FANUC CORPORATION, Yamanashi (JP)

(72) Inventor: Yasuyuki Nakazawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 156 days.

(21) Appl. No.: 16/036,944

(22) Filed: Jul. 17, 2018

(65) Prior Publication Data

US 2019/0022810 A1 Jan. 24, 2019

(30) Foreign Application Priority Data

Jul. 24, 2017 (JP) ................. 2017-142733

(51) Int. Cl.
| | | |
|---|---|---|
| *B23Q 5/04* | (2006.01) | |
| *B23Q 1/70* | (2006.01) | |
| *H02K 1/00* | (2006.01) | |
| *H02K 15/14* | (2006.01) | |
| *H02K 5/173* | (2006.01) | |
| *H02K 7/04* | (2006.01) | |
| *B23Q 5/10* | (2006.01) | |
| *B23Q 1/01* | (2006.01) | |

(52) U.S. Cl.
CPC ................ *B23Q 5/04* (2013.01); *H02K 1/00* (2013.01); *H02K 5/1732* (2013.01); *H02K 7/04* (2013.01); *H02K 15/14* (2013.01); *B23Q 1/01* (2013.01); *B23Q 1/70* (2013.01); *B23Q 5/10* (2013.01); *H02K 2205/03* (2013.01)

(58) Field of Classification Search
CPC ..... B23B 31/261; B23B 2250/12; B23Q 5/04; B23Q 5/10; B23Q 1/01; B23Q 1/70; H02K 5/1732; H02K 7/04; H02K 15/14
See application file for complete search history.

(56) References Cited

U.S. PATENT DOCUMENTS 3,804,562 A * 4/1974 Hansson ............... F16C 19/548
                                                                418/107
5,538,292 A * 7/1996 Sommer ............. F16L 27/0808
                                                                137/580

(Continued)

FOREIGN PATENT DOCUMENTS

| CN | 1767324 A | 5/2006 |
|---|---|---|
| CN | 101577459 A | 11/2009 |

(Continued)

*Primary Examiner* — Andrew M Tecco
*Assistant Examiner* — Nicholas E Igbokwe
(74) *Attorney, Agent, or Firm* — Hauptman Ham, LLP

(57) ABSTRACT

A motor able to prevent axial displacement of a rotor in a simple structure without increasing the number of parts of the motor. The motor includes a rotor including a shaft, a housing configured to support the shaft rotatably and movably in a limited manner in an axial direction, a flange disposed on an axially outside of the housing and configured to rotate integrally with the shaft, the flange projecting radially outward from the shaft and being configured to prevent a foreign object from entering the housing, and a temporary tacking structure provided in at least one of the flange and the housing, and configured to temporarily tack the housing and the flange to each other in the axial direction.

10 Claims, 12 Drawing Sheets

(56) References Cited

U.S. PATENT DOCUMENTS

| | | | |
|---|---|---|---|
| 2002/0159852 A1* | 10/2002 | Katsuzawa | B23Q 11/103 409/135 |
| 2008/0080943 A1* | 4/2008 | Bernhard | B23B 31/261 409/233 |
| 2015/0354549 A1* | 12/2015 | Rabhi | F16D 3/84 417/375 |
| 2016/0049843 A1* | 2/2016 | Lin | H02K 5/04 310/49.01 |
| 2016/0099629 A1* | 4/2016 | Akashi | H02K 1/2773 310/51 |
| 2016/0167185 A1* | 6/2016 | Nakazawa | F16L 39/04 285/272 |
| 2016/0290340 A1* | 10/2016 | Maurino | F01P 3/20 |

FOREIGN PATENT DOCUMENTS

| | | |
|---|---|---|
| CN | 208738935 U | 4/2019 |
| JP | S58-3770 U | 1/1983 |
| JP | 2011-148015 A | 8/2011 |
| JP | 2016-86561 A | 5/2016 |

* cited by examiner

MOTOR WITH SHAFT MOVABLE IN LIMITED MANNER, AND MACHINE TOOL

RELATED APPLICATIONS

The present application claims priority of Japanese Application Number 2017-142733, filed Jul. 24, 2017, the disclosure of which is hereby incorporated by reference herein in its entirety.

BACKGROUND OF THE INVENTION

1. Field of the Invention

The present invention relates to a motor with a shaft that is movable in a limited manner, and a machine tool.

2. Description of the Related Art

A technique of confining a rotor of a motor in an axial direction by attaching a confinement fitting to the rotor on an axially outside of the motor has been known. (e.g., JP 58-3770 Y).

It has been desired to implement a technique of preventing axial displacement of the rotor in a simpler structure without increasing the number of parts of the motor.

SUMMARY OF THE INVENTION

In an aspect of the present disclosure, a motor includes a rotor having a shaft; a housing supporting the shaft so as to be movable in an axial direction in a limited manner and to be rotatable; a flange disposed axially outside of the housing and provided at the shaft so as to rotate integrally with the shaft, the flange projecting radially outward from the shaft and being configured to prevent a foreign object from entering the housing; and a temporary tacking structure provided at at least one of the housing and the flange and configured to temporarily tack the housing and the flange to each other in an axial direction.

According to the present disclosure, the flange acting as a rotational element of the motor and the housing acting as a fixed element of the motor are temporarily tacked in the axial direction to prevent axially rearward displacement of the shaft of the rotor. Therefore, the axial displacement of the rotor can be prevented in a simple structure without increasing the number of parts of the motor.

DETAILED DESCRIPTION

Figure 1:
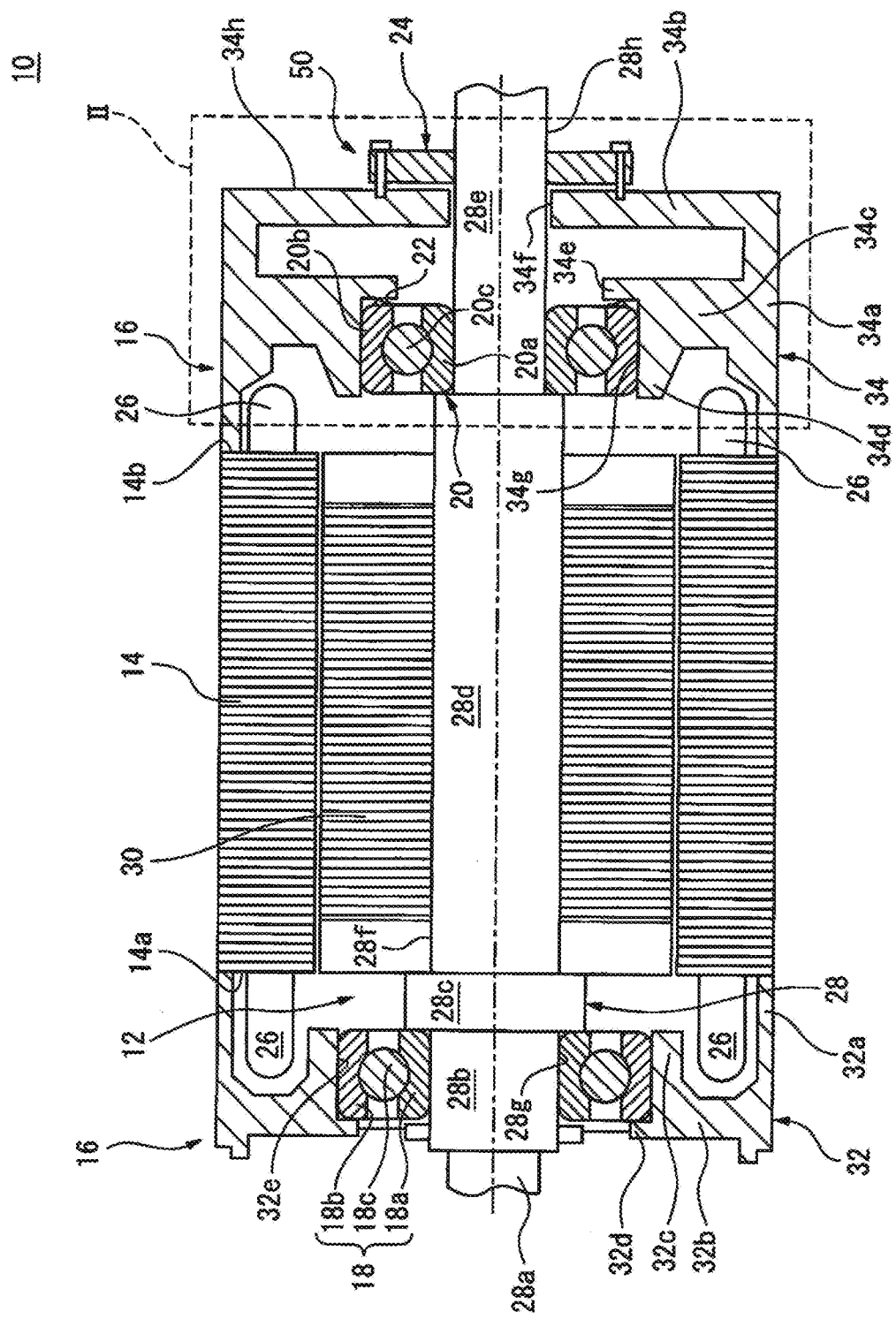
FIG. 1 is a cross-sectional view of a motor according to an embodiment.

Hereinafter, embodiments of the present disclosure will be described in detail with reference to the drawings. Note that, in the various embodiments described below, similar elements are assigned the same reference numerals, and redundant descriptions thereof will be omitted. Further, in the following description, an axial direction corresponds to a direction along a rotation axis O of a rotor 12, and a radial direction corresponds to a direction of radius of a circle centered about the axis O, and a circumferential direction corresponds to a circumferential direction of the circle. Further, for convenience, the leftward direction in FIG. 1 is referred to as an axially frontward direction (first direction).

A motor 10 according to an embodiment is described with reference to FIGS. 1 to 3. The motor 10 includes a rotor 12, a stator 14, a housing 16, bearings 18 and 20, a biasing section 22, and a flange 24. The stator 14 is made of e.g. a plurality of magnetic steel sheets stacked in the axial direction. A coil 26 is wound around the stator 14.

The rotor 12 includes a shaft 28 extending in the axial direction and a rotor core 30 fixed on the radially outside of the shaft 28. The shaft 28 includes a first portion 28a, a second portion 28b, a third portion 28c, a fourth portion 28d, and a fifth portion 28e.

The first portion 28a is a circular-column shaped member extending axially frontward out from the housing 16. The first portion 28a is connected to an external device, such as a spindle, at its axially front end, and outputs the rotation force of the motor 10 to the external device.

The second portion 28b is a circular-column shaped member having a diameter greater than that of the first portion 28a, and is connected to an axially rear end of the first portion 28a. The third portion 28c is a circular-column shaped member having a diameter greater than those of the second portion 28b and the fourth portion 28d, and is connected to an axially rear end of the second portion 28b.

The fourth portion 28d is a circular-column shaped member having a diameter greater than that of the fifth portion 28e, and is connected to an axially rear end of the third portion 28c. The fifth portion 28e is connected to an axially rear end of the fourth portion 28d and extends axially rearward out from the housing 16.

The rotor core 30 is arranged to be slightly separate axially inward from the stator 14. The rotor core 30 stores therein a plurality of magnets or electrical conductors (not illustrated), and is rotated about the axis O by a rotating magnetic field generated by the coil 26 of the stator 14. The rotor core 30 is fixed on an outer peripheral surface 28f of the fourth portion 28d of the shaft 28.

The housing 16 is fixed to the stator 14, and rotatably supports the rotor 12 via the bearings 18 and 20. Specifically, the housing 16 includes an annular front housing 32 fixed to the stator 14 at axially front side of the stator 14, and an annular rear housing 34 fixed to the stator 14 at axially rear side of the stator 14.

The front housing 32 includes a first tubular portion. 32a, a front wall 32b, and a second tubular portion. 32c. The first tubular portion 32a is fixed on an axially front end face 14a of the stator 14. The front wall 32b is annular and extends radially inward from the axially front end of the first tubular port on 32a.

An annular projection 32d is formed at a radially inner end of the front wall 32b. The front wall 32b defines an axially front end of the housing 16. The second tubular portion 32c extends axially rearward from the radially inner end of the front wall 32b.

The rear housing 34 includes a first tubular portion 34a, a rear wall 34b, a middle wall 34c, and a second tubular portion 34d. The first tubular portion 34a is fixed on an axially rear end face 14b of the stator 14.

The rear wall 34b is annular and extends radially inward from the axially rear end of the first tubular portion. 34a. A center hole 34f formed in the rear wall 34b rotatably receives the fifth portion 28e of the shaft 28. The rear wall 34b defines an axially rear end of the housing 16.

The middle wall 34c extends radially inward from the first tubular portion 34a at a position separated axially frontward from the rear wall 34b. The second tubular portion 34d extends axially frontward from the radially inner end of the middle wall 34c. An annular projection 34e is formed at the radially inner end of the middle wall 34c.

The bearing 18 is interposed between the radially inner end face 32e of the second tubular portion 32c of the front housing 32 and an outer peripheral surface 28g of the second portion 28b of the shaft 28. Specifically, the bearing 18 includes an inner race 18a, an outer race 18b, and a rolling element 18c. An inner peripheral surface of the inner race 18a is in contact with the outer peripheral surface 28g of the shaft 28, and an axially rear end face of the inner race 18a is in contact with an axially front end face of the third portion 28c of the shaft 28.

An outer peripheral surface of the outer race 18b is in contact with the end face 32e of the front housing 32, and an axially front end face of the outer race 18b is in contact with the annular projection 32d. The rolling element 18c is disposed between the inner race 18a and the outer race 18b, and rolls on the outer peripheral surface of the inner race 18a and on the inner peripheral surface of the outer race 18b. Thus, the outer peripheral surface of the inner race 20a and the inner peripheral surface of the outer race 20b function as a raceway surface.

The bearing 20 is interposed between a radially inner end face 34g of the second tubular portion 34d of the rear housing 34 and an outer peripheral surface 28h of the fifth portion 28e of the shaft 28. Specifically, the bearing 20 includes an inner race 20a, an outer race 20b, and a rolling element 20c. An inner peripheral surface of the inner race 20a is in contact with the outer peripheral surface 28h of the shaft 28, and the axially front end face of the inner race 20a is in contact with an axially rear end face of the fourth portion 28d of the shaft 28.

An outer peripheral surface of the outer race 20b is in contact with the end face 34g of the rear housing 34. The rolling element 20c is disposed between the inner race 20a and the outer race 20b, and rolls on the outer peripheral surface of the inner race 20a and on the inner peripheral surface of the outer race 20b. Thus, the outer peripheral surface of the inner race 20a and the inner peripheral surface of the outer race 20b function as a raceway surface.

Figure 2:
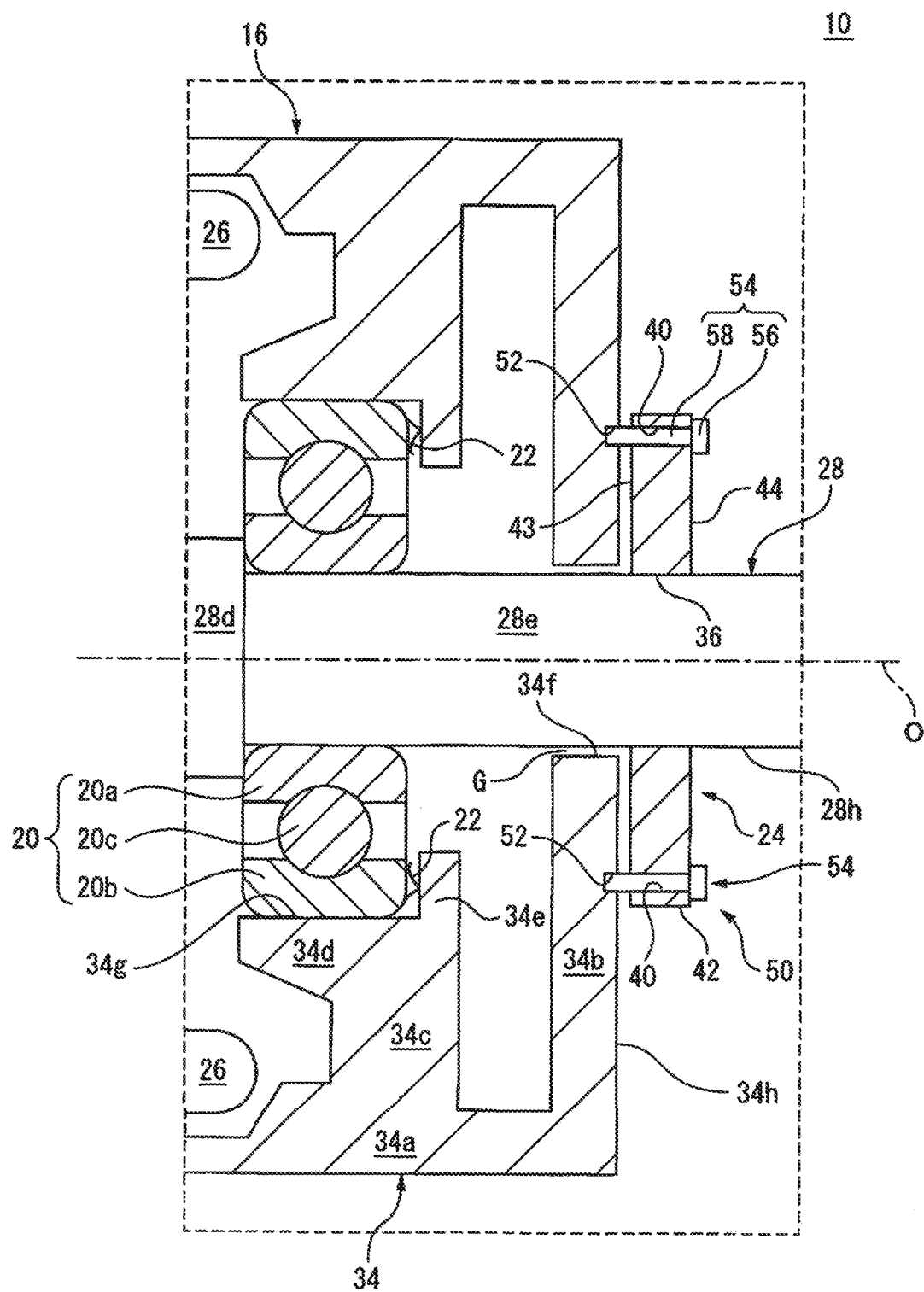
FIG. 2 is an enlarged view of a region II of FIG. 1.

As illustrated in FIG. 2, the biasing section 22 is interposed between the annular projection 34e of the rear housing 34 and the outer race 20b of the bearing 20. In this embodiment, the biasing section 22 is an annular plate spring that biases the outer race 20b axially frontward.

The biasing force applied to the outer race 20b by the biasing section 22 slightly displaces the outer race 20b axially frontward. Due to this, a contact angle is formed between the inner race 20a and the outer race 20b so as to apply an axially frontward pressing force to the rolling element 20c and the inner race 20a from the outer race 20b. As a result, an axially frontward pressing force is applied to the fourth portion 28d that engages the inner race 20a.

By the biasing section 22 biasing the outer race 20b of the bearing 20 axially frontward in this way, a preload is applied to the rotor 12 to axially frontward, thereby the rotor 12 is slightly displaced axially frontward. Along with this, the inner race 18a of the bearing 18 is also slightly displaced axially frontward.

In this way, a contact angle is formed between the inner race 18a and the outer race 18b of the bearing 18. By the contact angles formed in the bearings 18 and 20, the rolling elements 18c and 20c can securely be in contact with the raceway surfaces, thereby it is possible to properly operate the rolling elements 18c and 20c.

Thus, in this embodiment, the shaft 28 of the rotor 12 is rotatably supported by the housing 16 via the bearings 18 and 20, such that the axial movement of the shaft 28 is limited but slightly allowed (i.e., movable in a limited manner). The biasing section 22 functions as a preload structure configured to preload the rotor 12 to axially frontward.

The flange 24 is an annular member projecting radially outward from the fifth portion 28e of the shaft 28. The flange 24 is fixedly provided on the fifth portion 28e so as to rotate integrally with the shaft 28 (in other words, to be immovable relative to the shaft 28).

The flange 24 is slightly separated axially rearward from the rear wall 34b of the rear housing 34 so as to be adjacent to the rear wall 34b. An axially frontward end face 43 of the flange 24 faces an axially rearward end face 34h of the rear wall 34b. The flange 24 covers a gap G between a wall defining the center hole 34f of the rear wall 34b and the outer peripheral surface 28h of the fifth portion 28e from the axially outside.

The flange 24 is a member having functions of preventing a foreign object, such as a cutting fluid, from entering the housing 16 from the gap G and of dissipating heat from the flange 24, during operation of the motor 10. In this embodiment, the flange 24 is provided as a different member separate from the shaft 28. The flange 24, however, may be provided integrally with the shaft 28.

Figure 3:
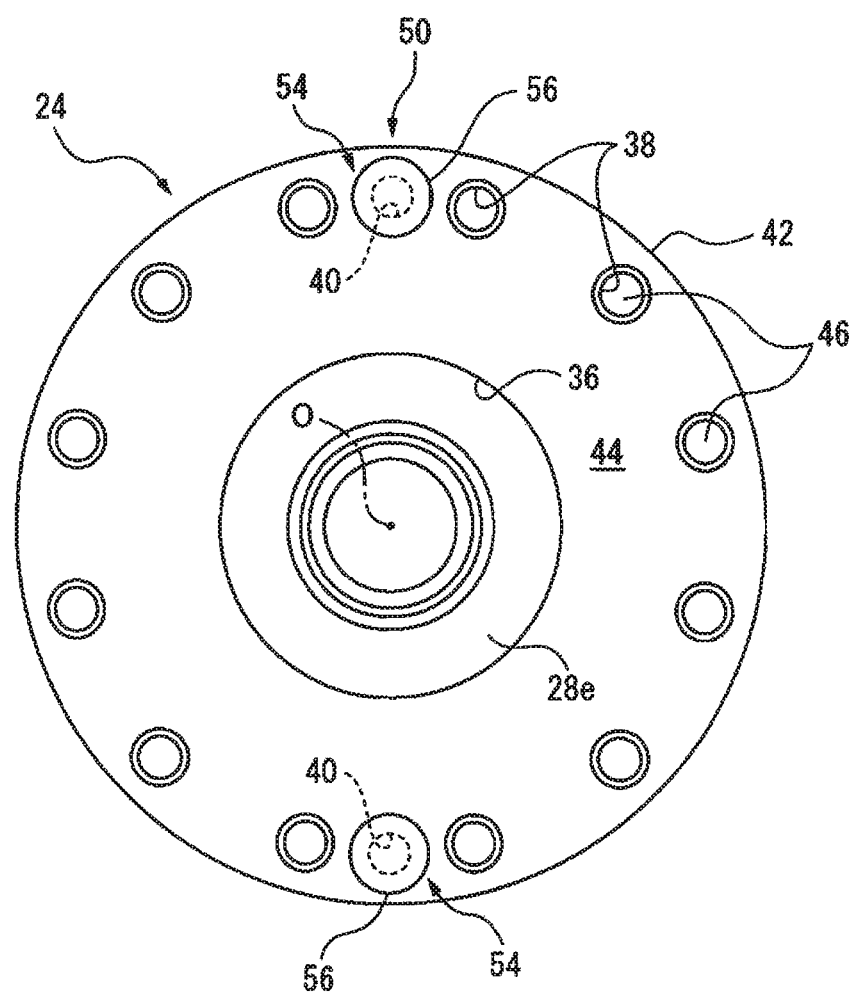
FIG. 3 is a view of a flange of FIG. 1 when seen from the rear side in an axial direction.

Referring to FIGS. 2 and 3, the flange 24 is formed with a center hole 36, a plurality of balancer holes 38 (FIG. 3), and a plurality of through holes 40. The center hole 36 is formed to extend through the flange 24 in the axial direction, and immovably receives the fifth portion 28e of the shaft 28. The flange 24 is fixed on the outer peripheral surface 28h of the fifth portion 28e e.g. by shrink fitting.

The balancer holes 38 are arranged to align in the circumferential direction at predetermined intervals. The balancer holes 38 are arranged close to an outer peripheral surface 42 of the flange 24 at radial positions closer to the outer peripheral surface 42 of the flange 24 than the center hole 36. Each balancer hole 38 is formed to be recessed axially frontward from an axially rear end face 44 of the flange 24 so as not to completely penetrate the flange 24.

In this embodiment, a total of twelve balancer holes 38 are formed such that a total of six pairs of balancer holes 38 are formed, wherein each pair of balancer holes 38 are arranged symmetrically with each other with respect to the axis O. The balancer holes 38 respectively receive balancer weights 46 configured to balance the rotation of the rotor 12.

In this embodiment, a pair of through holes 40 is formed to axially extend through the flange 24. The pair of through holes 40 is arranged symmetrically with each other with respect to the axis O. The through holes 40 may be threaded holes with the threaded portion, or be unthreaded holes.

When the external device, such as the spindle, is connected to the first portion 28a of the shaft 28, the shaft 28 may be pressed and slightly displaced axially rearward. In this case, the inner races 18a and 20a of the bearings 18 and 20 are also displaced axially rearward.

Due to this, the contact angle decreases in the bearing 18, by which a gap may be formed between the rolling element 18c and the raceway surface (so-called "preload loss"). On the other hand, the contact angle increases excessively in the bearing 20, thereby the bearing 20 is brought into an excessive-preload state. In this case, heat generation increases in the bearings 18 and 20 during operation of the motor 10, and the possibility of damaging the bearings 18 and 20 also increases.

In order to prevent such a situation, the motor 10 according to this embodiment further includes a temporary tacking structure 50. The temporary tacking structure 50 is for temporarily tacking the rear wall 34b of the housing 16 and the flange 24 to each other in the axial direction to prevent the axially-rearward movement of the shaft 28 relative to the housing 16.

In this embodiment, the temporary tacking structure 50 includes the above-mentioned two through holes 40 and a total of the two engaging sections 52. Each engaging section 52 is a threaded hole formed in the rear wall 34b of the rear housing 34 so as to be recessed inward from the axially rearward end face 34h of the rear wall 34b. The engaging sections 52 are respectively arranged at radial positions substantially the same as those of the through holes 40 formed in the flange 24.

Two fasteners 54 are inserted into the through holes 40 and respectively engage with the engaging sections 52. Each fastener 54 is circular-column shaped, and has a head 56 and a shaft 58 extending axially rearward from the head 56.

The head 56 has a diameter larger than that of the shaft 58, and contacts the end face 44 of the flange 24 on the axially front side of the head 56. A threaded portion is formed on the outer peripheral surface of the shaft 58, wherein the shaft 58 is inserted into the through hole 40 and threadedly engage the engaging section 52 at the axially front end of the shaft 58. If the through hole 40 is a threaded hole, the threaded portion formed on the outer peripheral surface of the shaft 58 further threadedly engages the through hole 40.

In this way, each fastener 54 extends between the flange 24 and the rear wall 34b, and releasably engage the engaging section 52 at the axially front end of the fastener 54 (i.e., at the front end of the shaft 58), while releasably engaging the flange 24 at the axially rear end (i.e., the head 56) of the fastener 54. Thus, the flange 24 and the rear wall 34b are mechanically connected with each other in a releasable manner via the temporary tacking structures 50 and the fasteners 54.

When the external device such as the spindle is connected to the first portion 28a of the shaft 28, the fasteners 54 are inserted into the through holes 40 to engage the engaging section 52 and the flange 24, as illustrated in FIGS. 1 to 3. Due to this, the axially-rearward displacement of the flange 24 relative to the rear wall 34b is prevented, and therefore the axially-rearward displacement of the shaft 28, on which the flange 24 is fixed, relative to the housing 16 is also prevented.

The fasteners 54 are removed from the engaging sections 52 and the through holes 40 during operation of the motor 10. Thereby, the flange 24 and the rotor 12 can rotate relative to the housing 16.

As described above, According to this embodiment, the flange 24, which is one of the rotational elements of the motor 10, and the housing 16, which is a fixed element of the motor 10, are temporarily tacked in the axial direction using the temporary tacking structure 50 and the fasteners 54, so as to prevent the shaft 28 of the rotor 12 from being displaced axially rearward. According to this configuration, it is possible to prevent the shaft 28 from being displaced axially rearward by a simpler structure, without increasing the number of parts of the motor 10.

Further, the temporary tacking structure 50 of this embodiment includes the through holes 40 and the engaging sections 52. According to this configuration, it is possible to implement the temporary tacking structures 50, that can bring about function as described above, in a simpler structure and at low cost.

Further, in this embodiment, the pair of through holes 40 are provided symmetrically with respect to the axis O. According to this configuration, it is possible to prevent unbalanced rotation of the rotor 12 during the operation of the motor 10.

Next, a motor 60 according to another embodiment will be described with reference to FIGS. 4 and 5. Note that, in FIG. 5, the fasteners 54 are not illustrated for easy understanding. The motor 60 differs from the above-mentioned motor 10 in the structure of a temporary tacking structure 50' and a flange 62.

The flange 62 projects radially outward from the fifth portion 28e of the shaft 28, and is fixedly provided on the fifth portion 28e so as to rotate integrally with the shaft 28, similar as the above-mentioned flange 24. The flange 62 is arranged slightly separate axially rearward from the rear wall 34b of the rear housing 34 so as to be adjacent to the rear wall 34b, wherein the axially frontward end face 43 of the flange 62 faces the end face 34h of the rear wall 34b.

In this embodiment, a pair of through holes 66 are formed in the flange 62 so as to be disposed symmetrically with each other with respect to the axis O. Each of the through holes 66 extend through the flange 62, and includes the balancer hole 38 and a communication hole 64. Each communication hole 64 communicates with the corresponding balancer hole 38, and is formed to be substantially concentric to the corresponding balancer hole 38.

Specifically, each communication hole 64 extends from a bottom surface 38a of the corresponding balancer hole 38 to the axially frontward end face 43 of the flange 62. One through hole 66, which extends through the flange 62 in the axial direction, is defined by the balancer hole 38 and the communication hole 64 which communicate with each other.

A total of twelve balancer holes 38, which includes two balancer holes 38 that constitute the two through holes 66, are arranged to align in the circumferential direction at predetermined intervals, similar as the embodiment described above, so as to form a total of six pairs of balancer holes 38 in which each pair of balancer holes 38 are arranged symmetrically with each pother with respect to the axis O.

The temporary tacking structure 50' according to this embodiment includes the through holes 66 and the engaging sections 52. When the external device such as the spindle is connected to the first portion 28*a* of the shaft 28, the two fasteners 54 are respectively inserted into the two through holes 66 as illustrated in FIG. 4, and releasably engage the engaging sections 52 and the flange 62.

In this way, the flange 62 and the housing 16 are temporarily tacked to each other in the axial direction using the temporary tacking structure 50' and the fasteners 54, so as to prevent the axially rearward displacement of the shaft 28. When the motor 60 is operated, the fasteners 54 are removed from the engaging sections 52 and the through holes 66, and instead, the balancer weights 46 are inserted into the balancer holes 38 of the through hole 66. By this, the communication holes 64 are closed, and thereby it is possible to prevent the foreign object such as cutting fluid from entering the housing 16.

According to this embodiment, the balancer holes 38 for receiving the balancer weights 46 can be utilized for inserting the fasteners 54. Due to this configuration, it is possible to effectively prevent unbalanced rotation of the rotor 12 during the operation of the motor 60.

Note that, the communication holes 64 may or may not be threaded holes. If the communication holes 64 are threaded holes, the threaded portion formed on the outer peripheral surface of each shaft 58 of the fastener 54 further engages each communication hole 64. Instead of providing the communication holes 64, the balancer holes 38 may be extended to penetrate the flange 62 between the end face 44 and the end face 43.

Next, a motor 70 according to still another embodiment will be described with reference to FIGS. 6 and 7. A motor 70 differs from the above mentioned motor 10 in the structures of a rear housing 34', a flange 24', and a temporary tacking structure 72.

Specifically, the Flange 24' differs from the above-mentioned flange 24 in that no through hole 40 is formed therein. In addition, a recess 34*i* is formed in the rear wall 34*b* of the housing 34' so as to be recessed inward from the axially rear end face 34*h* of the rear wall 34*b*.

Figure 6:
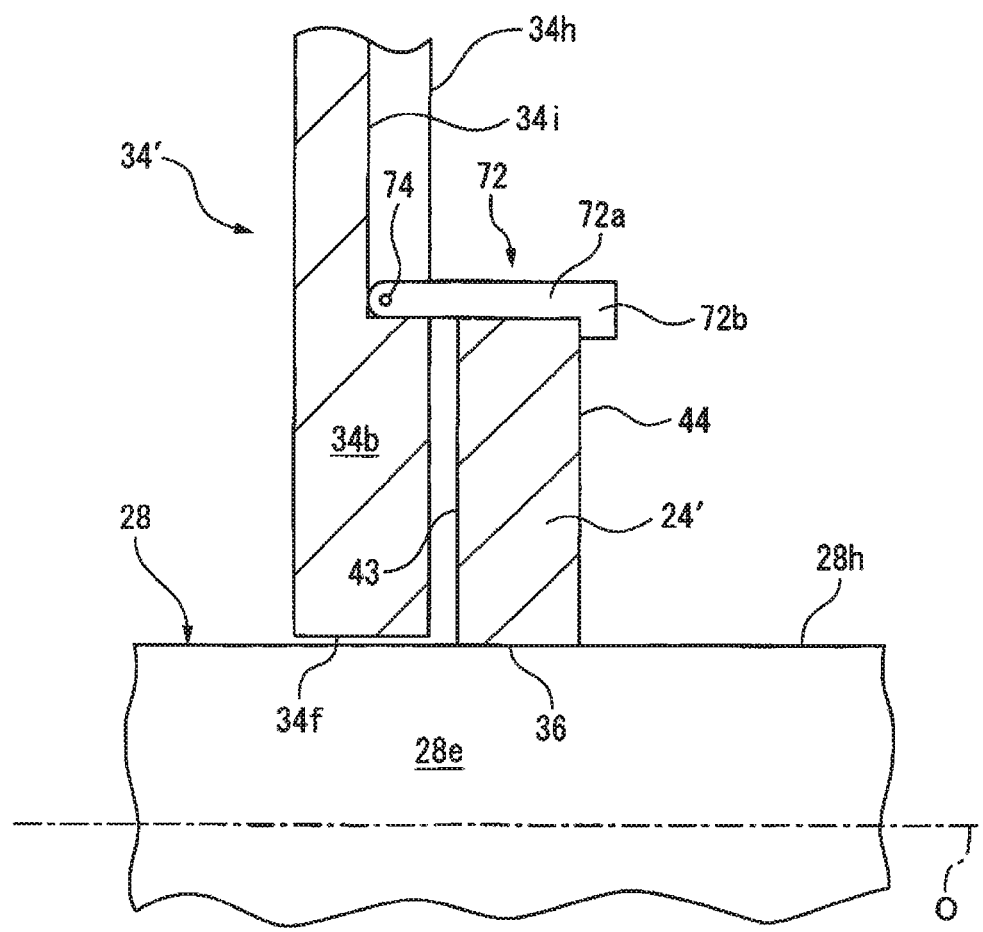
FIG. 6 is an enlarged cross-sectional view of main components of a motor according to still another embodiment in which a temporary tacking structure is disposed at a projected position.
Figure 7:
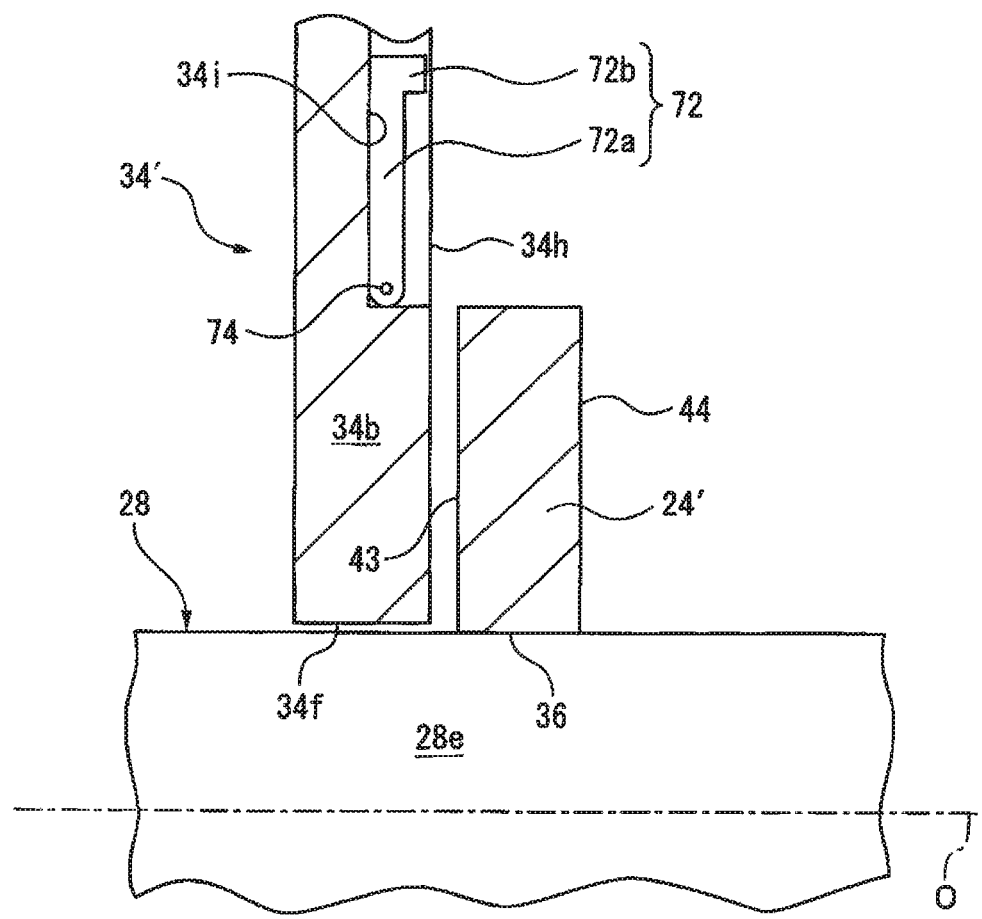
FIG. 7 illustrates the temporary tacking structure of FIG. 6 disposed in a retracted position.

The temporary tacking structure 72 is provided at the rear wall 34*b* of the rear housing 34' so as to be movable between a projected position illustrated in FIG. 6 and a retracted position illustrated in FIG. 7. Specifically, the temporary tacking structure 72 includes a main body 72*a* and an engaging section 72*b* projecting outward from the distal end of the main body 72*a*. The main body 72*a* is pivotably supported at its proximal end by a pin 74 fixed on the rear wall 34*b*.

When the temporary tacking structure 72 is arranged at the projected position illustrated in FIG. 6, the engaging section 72*b* contacts and engages the axially rear end face 44 of the flange 24'. On the other hand, when the temporary tacking structure 72 is arranged at the retracted position illustrated in FIG. 7, the temporary tacking structure 72 is accommodated in the recess 34*i* of the rear wall 34*b*.

When the external device such as the spindle is connected to the first portion 28*a* of the shaft 28, a user positions the temporary tacking structure 72 at the projected position. Due to this, the temporary tacking structure 72 extends between the rear wall 34*i*, and the flange 24' so as to mechanically connect the rear wall 34*b* and the flange 24' to each other, and the engaging section. 72*b* releasably engages with the flange 24'.

In this way, the temporary tacking structure 72 temporarily tacks the rear wall 34*b* and the flange 24' to each other in the axial direction, so as to prevent the axially rearward movement of the shaft 28 relative to the housing 16. On the other hand, when operating the motor 70, the user rotates the temporary tacking structure 72 about the pin 74 so as to position it at the retracted position illustrated in FIG. 7.

According to this embodiment, the temporary tacking structure 72 temporarily tacks the flange 24', which is one of the rotational elements of the motor 70, and the housing 16, which is a fixed element of the motor 70, in the axial direction, thereby preventing the axially rearward displacement of the shaft 28. Due to this, it is possible to prevent the shaft 28 from being displaced axially rearward by a simpler structure, without increasing the number of parts of the motor 70.

Note that, a temporary tacking structure similar as the temporary tacking structure 72 may be provided at the flange 24'. In this case, a recess may be formed to be recessed inward from the axially front end face 43 of the flange 24', wherein the temporary tacking structure may be rotatably supported in the recess.

On the other hand, an engaging section that can engage with the engaging section of the temporary tacking structure may be formed at the axially rear end face 34*h* of the rear wall 34*b*. When the temporary tacking structure is arranged at its projected position, the temporary tacking structure can engage with the engaging section and prevent the axially rearward displacement of the rotor 12.

Figure 8:
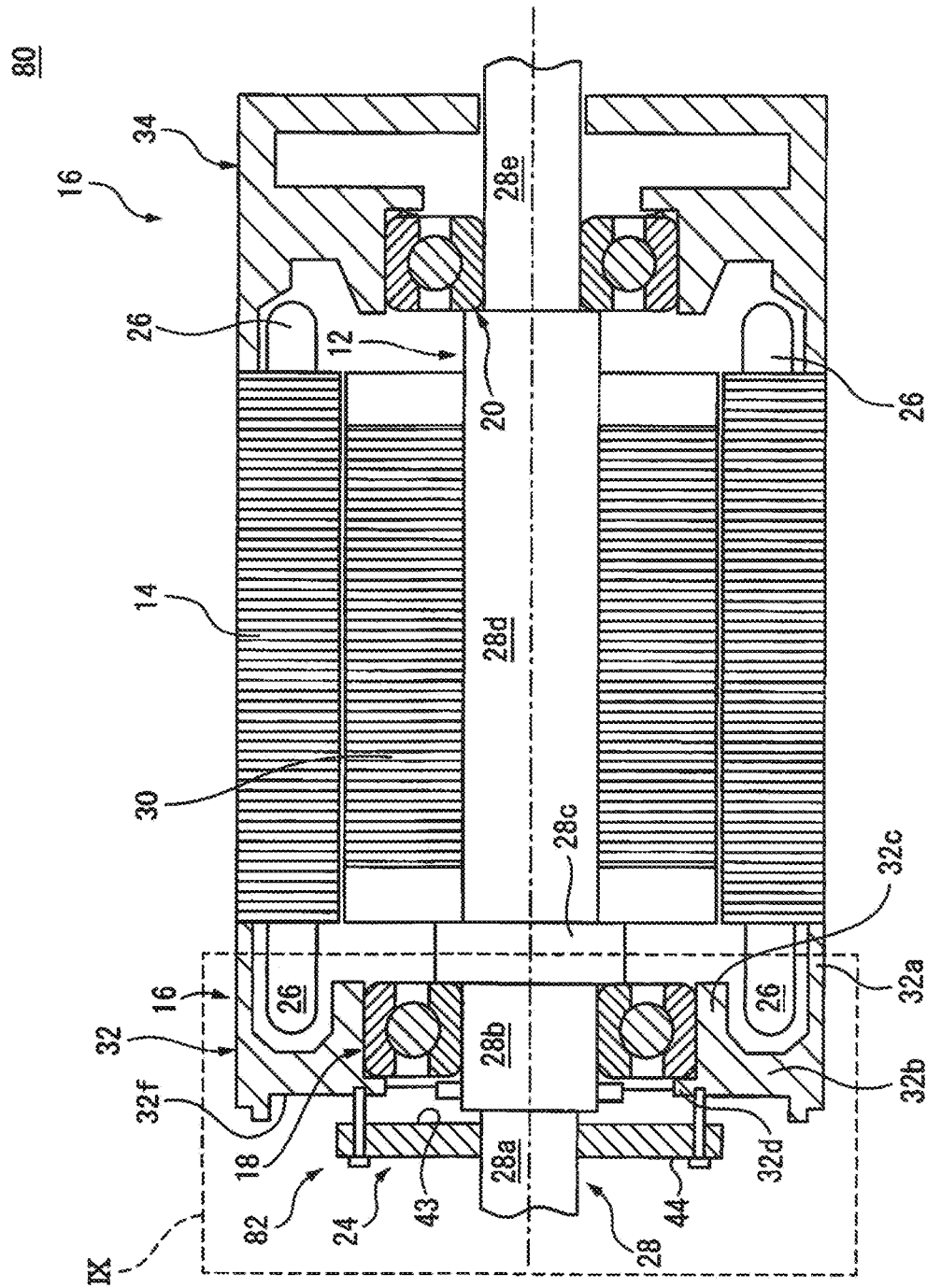
FIG. 8 is a cross-sectional view of a motor according a further embodiment.

Next, a motor 80 according to a further embodiment will be described with reference to FIGS. 8 and 9. The motor 80 differs from the above-mentioned motor 10 in the attachment position of the flange 24 and in the structure of a temporary tacking structure 82.

In this embodiment, the flange 24 is fixedly provided on the outer peripheral surface of the first portion 28*a* of the shaft 28, and arranged slightly separate axially frontward from the front wall 32*b* of the front housing 32 so as to be adjacent to the front wall 32*b*. The end face 43 of the flange 24 faces the axially front end face 32*f* the front wall 32*b*.

The temporary tacking structure 82 temporarily tacks the front wall 32*b* of the housing 16 and the flange 24 in the axial direction so as to prevent the rotor 12 from moving axially rearward relative to the housing 16. The temporary tacking structure 82 includes a total of two through holes 40 and a total of two engaging sections 84. Each engaging section 84 is a threaded hole formed in the front wall 32*b* so as to be recessed inward from the end face 32*f* of the front wall 32*b* of the front housing 32.

In this embodiment, the through holes 40 are threaded holes and the threaded portion formed on the shaft 58 of each fastener 54 threadedly engages with each through hole 40. The shafts 58 of the fasteners 54 are respectively screwed into the through holes 40 and threadedly engage with the engaging sections 84 at the distal ends of the shafts 58.

Each fastener 54 extends between the flange 24 and the front wall 32*b* so as to releasably engage the engaging section 84 at its axially rear end (i.e., the distal end), engage the through hole 40 at its axially center portion, and releasably engage the flange 24 at its axially front end (i.e., the head 56). By the engagement between the shaft 58 and the through hole 40, the axially rearward displacement of the flange 24 relative to the front wall 32*b* is prevented.

In this way, the flange 24 and the front wall 32*b* are mechanically connected with each other in a releasable manner via the temporary tacking structure 82 and the fasteners 54. Due to this, since the axially-rearward displacement of the flange 24 relative to the front wall 32*b* is prevented, the axially-rearward displacement of the shaft 28, on which the flange 24 is fixed, relative to the housing 16 is also prevented.

Next, a motor 90 according to a still further embodiment will be described with reference to FIGS. 10 and 11. The motor 90 differs from the above-mentioned motor 80 in a front housing 32', a flange 24', and a temporary tacking structure 92. A recess 32g is formed at the front wall 32b of the front housing 32' so as to be recessed inward from the axially front end face 32f of the front wall 32b.

Figure 10:
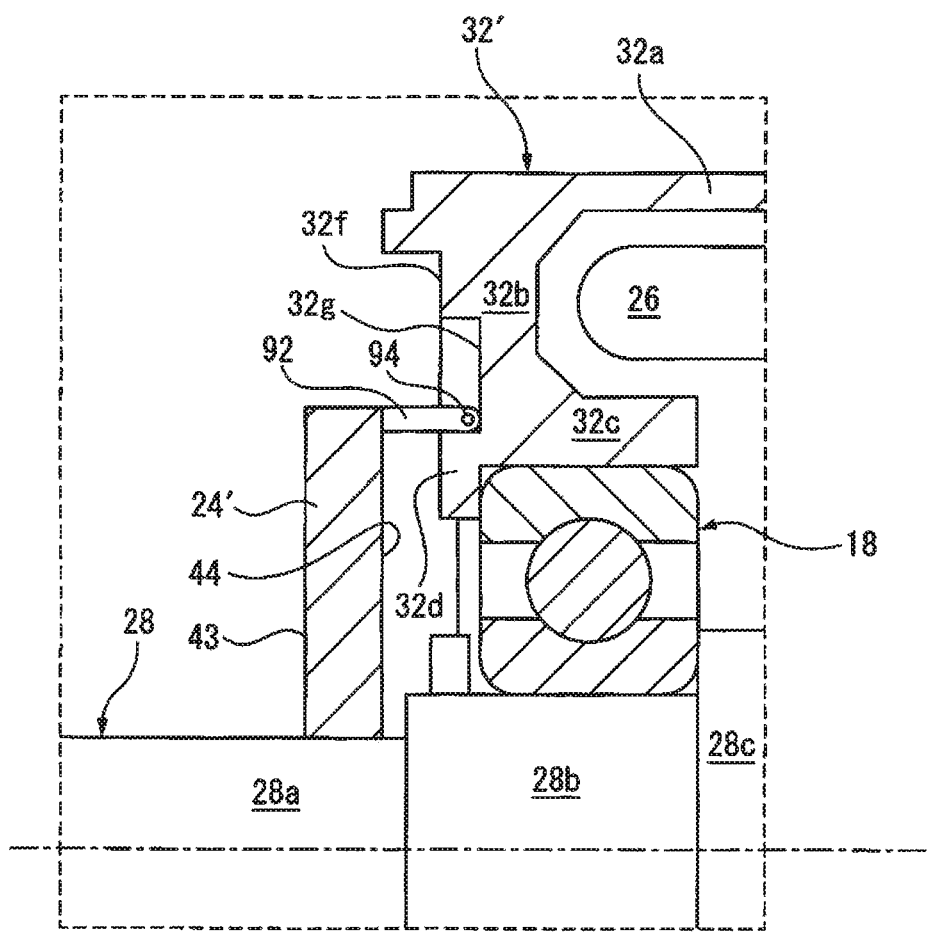
FIG. 10 is an enlarged cross-sectional view of main components of the motor according to a still further embodiment in which the temporary tacking structure is disposed at a projected position.
Figure 11:
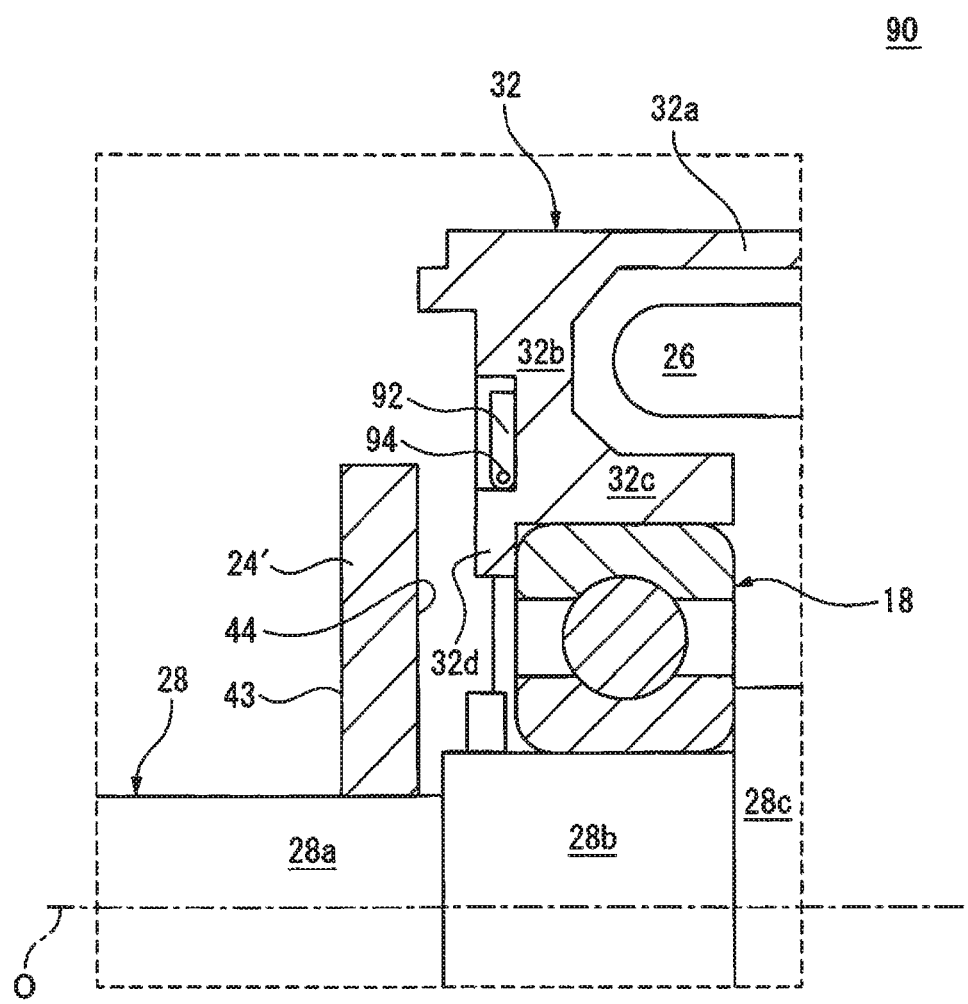
FIG. 11 illustrates the temporary tacking structure of FIG. 10 disposed in a retracted position.

The temporary tacking structure 92 is provided at the front wall 32b of the front housing 32' so as to be movable between a projected position illustrated in FIG. 10 and a retracted position illustrated in FIG. 11. Specifically, the temporary tacking structure 92 is pivotably supported at its proximal end by a pin 94 fixed on the front wall 32b.

The temporary tacking structure 92 contacts and engages, at its distal end, the end face 44 of the flange 24' when arranged at the projected position illustrated in FIG. 10. Thus, the distal end of the temporary tacking structure 92 functions as the engaging section configured to engage the flange 24'. On the other hand, when the temporary tacking structure 92 is arranged at the retracted position illustrated in FIG. 11, the temporary tacking structure 92 is accommodated in the recess 32g of the front wall 32b.

When the external device such as the spindle is connected to the first portion 28a of the shaft 28, the user positions the temporary tacking structure 92 at the projected position. Due to this, the temporary tacking structure 92 extends between the front wall 32b and the flange 24' so as to mechanically connect the front wall 32b and the flange 24', and engages the flange 24'.

As a result, the axially rearward movement of the rotor 12 relative to the housing 16 is prevented. On the other hand, when operating the motor 90, the user rotates the temporary tacking structure 92 about the pin 94 to position the temporary tacking structure 92 at the retracted position illustrated in FIG. 11.

According to this embodiment, the temporary tacking structure 92 temporarily tacks the flange 24', which is one of the rotational elements of the motor 90, and the housing 16, which is a fixed element of the motor 90, in the axial direction, thereby preventing the axially rearward displacement of the shaft 28. Due to this configuration, it is possible to prevent the shaft 28 from being displaced axially rearward by a simple structure, without increasing the number of parts of the motor 90.

Note that, a temporary tacking structure similar as the temporary tacking structure 92 may be provided at the flange 24'. In this case, a recess may be formed in the flange 24' so as to be recessed inward from the axially rearward end face 44 of the flange 24', wherein the temporary tacking structure may be pivotably supported in the recess. When this temporary tacking structure is arranged at its projected position, the distal end thereof contacts and engages the end face 32f of the front wall 32b so as to prevent the axially rearward displacement of the rotor 12.

Figure 12:
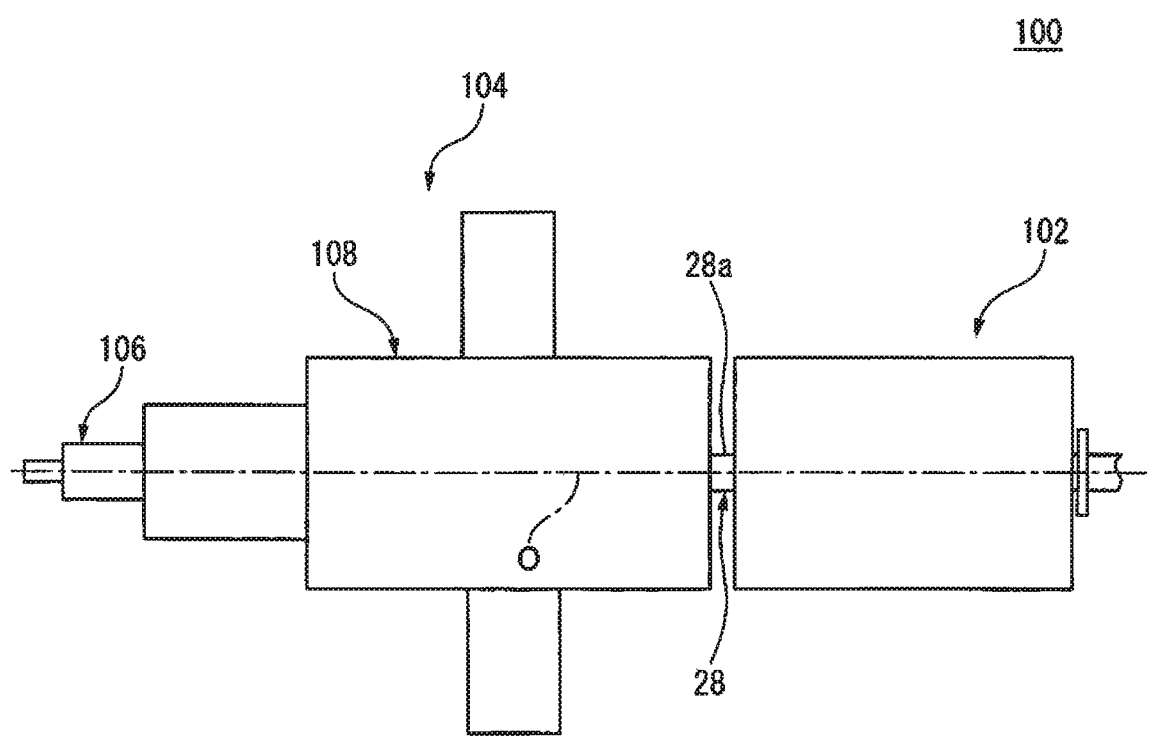
FIG. 12 illustrates a machine tool according to an embodiment.

A machine tool 100 according to an embodiment is described with reference to FIG. 12. The machine tool 100 includes a motor 102 and a spindle head 104. The motor 102 has a configuration similar as the above-mentioned motor 10, 60, 70, 80, or 90.

The spindle head 104 includes a spindle 106 and a spindle housing 108 that rotatably supports the spindle 106. The spindle 106 is disposed axially front side of the motor 102. An axially rear end of the spindle 106 is connected to the axially front end of the first portion 28a of the shaft 28 of the motor 102, via a coupling (not illustrated).

Figure 4:
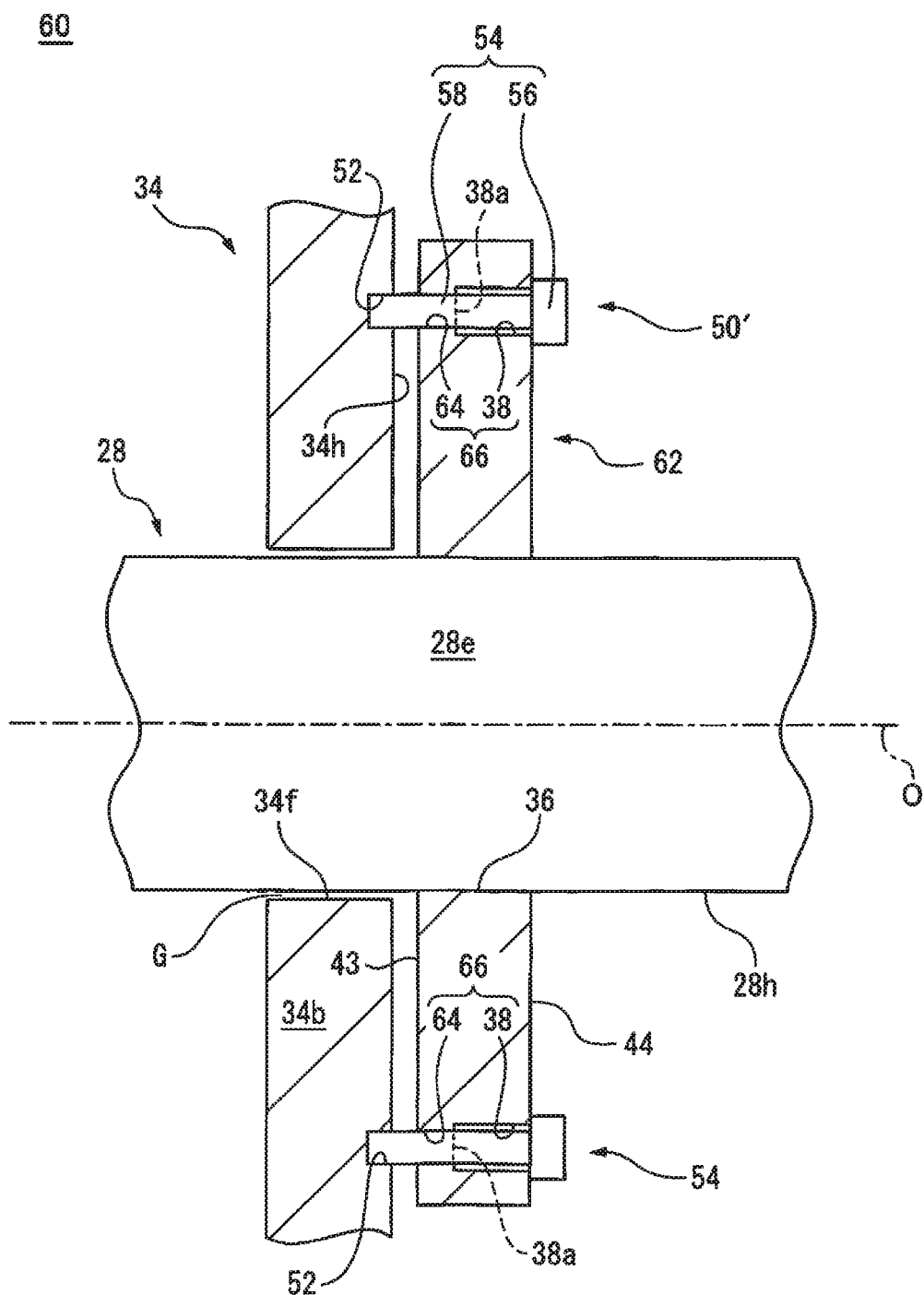
FIG. 4 is an enlarged cross-sectional view of main components of a motor according to another embodiment.
Figure 5:
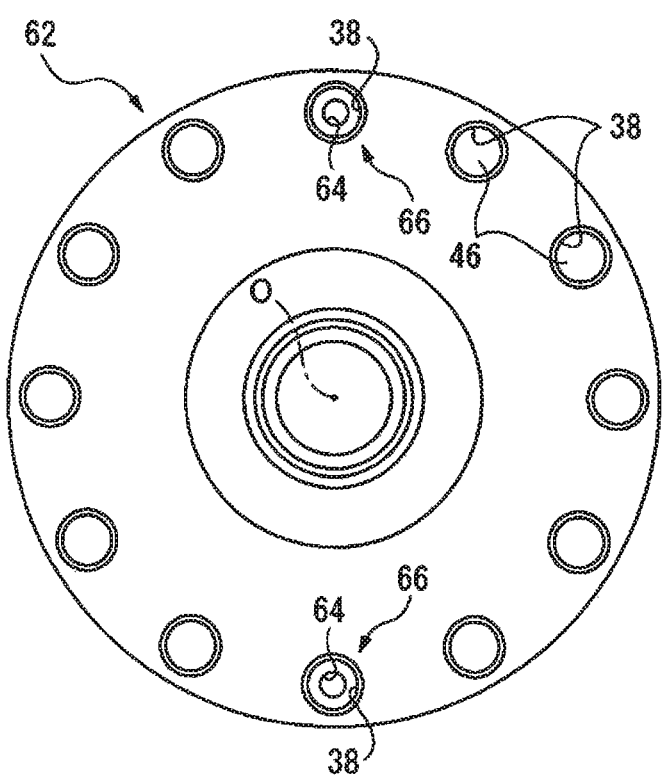
FIG. 5 is a view of the flange of FIG. 1 without fasteners when seen from the rear side in the axial direction.
Figure 9:
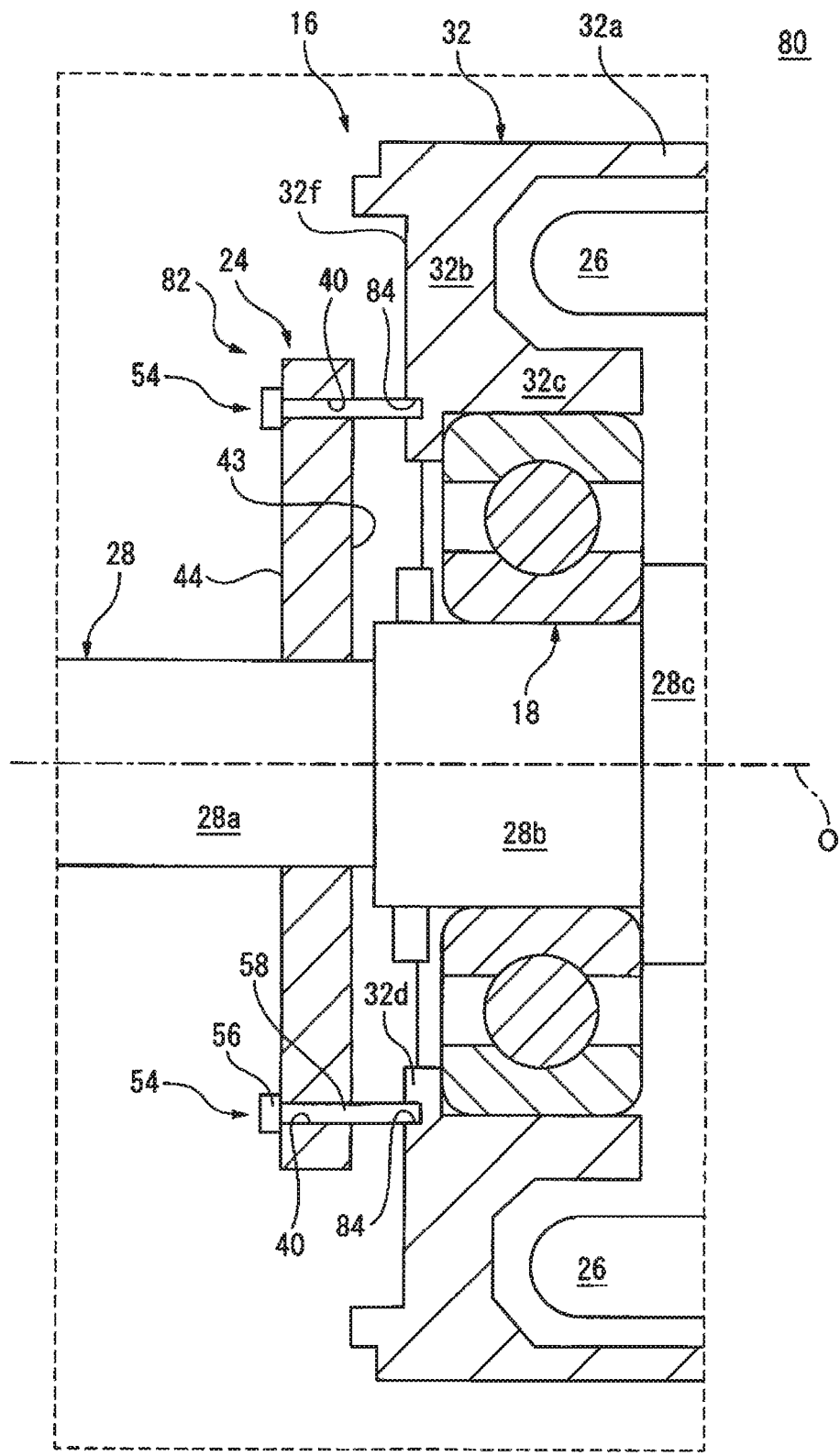
FIG. 9 is an enlarged view of a region IX of FIG. 8.

In the embodiments illustrated in FIGS. 2, 4, and 9, the temporary tacking structure (50, 50', 82) includes a total of the two through holes (40, 66) and a total of the two engaging sections (52, 84), and temporarily tacks the housing 16 and the flange 21 in the axial direction using a total of the two connectors 54.

However, the temporary tacking structure may include one through hole and one engaging section, and temporarily tack the housing 16 and the flange 24 in the axial direction using one connector 54. Decreasing the number of through holes can improve the strength and aesthetic appearance of the flange.

Alternatively, the temporary tacking structure may include a total of "n" (n is an integer not less than 3) through holes and "n" engaging sections, and temporarily tack the housing 16 and the flange 24 in the axial direction using the "n" connectors 54.

In this case, the n through holes and the n engaging sections may be disposed to form (n/2) pairs of the through holes and of the engaging sections, wherein each pair of the through holes and of engaging sections are arranged symmetrically with each other with respect to the axis O. This structure can prevent unbalanced rotation of the rotor 12 during the operation of the motor 10.

A plurality of the above-mentioned temporary tacking structures 72 or 92 may be provided. In the case where a total of "n" (n is an integer not less than 2) temporary tacking structures 72 or 92 are provided in the flange 24', the temporary tacking structures 72 or 92 may be arranged to form (n/2) pairs of the temporary tacking structures 72 or 92, wherein each pair of the temporary tacking structures 72 or 92 are arranged symmetrically with each other with respect to the axis O. This structure can prevent unbalanced rotation of the rotor 12 during the operation of the motor 10.

The flange 24, 24' or 62 is not limited to a circular shape, but may has any outer shape, such as oval or polygons. The motor 10, 60, 70, 80, or 90 may be any type of electric motor, such as an eternal magnet electric motor or an induction electric motor.

While the present disclosure has been described through the embodiments, the above-described embodiments do not limit the invention as defined by the appended claims.

The invention claimed is:

1. A motor, comprising:
   a rotor including a shaft;
   a housing configured to support the shaft so as to be movable in an axial direction in a limited manner and to be rotatable;
   a flange disposed axially outside of the housing and provided at the shaft so as to rotate integrally with the shaft, the flange projecting radially outward from the shaft and being configured to prevent a foreign object from entering the housing during operation of the motor; and
   a temporary tacking structure disposed on at least one of the housing or the flange, and configured to temporarily tack the housing and the flange to each other in the axial direction.

2. The motor according to claim 1, wherein the temporary tacking structure includes:
   a through hole formed in the flange so as to extend through the flange in the axial direction, and configured to receive a fastener for temporarily tacking the housing and the flange; and
   an engaging section formed in the housing and configured to releasably engage the fastener.

3. The motor according to claim 2, wherein a balancer hole, which is configured to receive a balancer weight for balancing rotation of the rotor, is formed in the flange separately from the through hole.

4. The motor according to claim 2, wherein the through hole includes a balancer hole configured to receive a balance weight for balancing rotation of the rotor.

5. The motor according to claim 2, wherein the through hole includes a threaded portion configured to engage the fastener.

6. The motor according to claim 1, further comprising a preload structure configured to preload the rotor in a first direction of the axial direction, wherein the flange is disposed adjacent to an end of the housing in a second direction opposite the first direction.

7. A machine tool comprising the motor according to claim 1.

8. The motor according to claim 1, wherein the temporary tacking structure is configured to temporarily tack the housing and the flange to each other in the axial direction during non-operation of the motor.

9. The motor according to claim 1, further comprising:
a stator fixed to the housing and surrounding the rotor.

10. The motor according to claim 1, wherein
the housing includes a recess recessed axially inward with respect to the flange to accommodate the temporary tacking structure,
the temporary tacking structure includes
a main body having one end pivotably supported on the housing, and
an engaging section projecting outwardly from another end of the main body to engage the flange, and
the temporary tacking structure is configured to move between a retracted position where the temporary tacking structure is accommodated within the recess of the housing, and a projected position where the temporary tacking structure projects outwardly from the recess to engage the engaging section with the flange.

* * * * *